(12) United States Patent
Sivakumar et al.

(10) Patent No.: US 11,995,761 B2
(45) Date of Patent: May 28, 2024

(54) METHODS AND SYSTEM FOR GENERATING VIRTUAL SENSOR DATA OF A VIRTUAL SINGLE-PHOTON AVALANCHE DIODE (SPAD) LIDAR SENSOR OF A VIRTUAL VEHICLE SIMULATOR

(71) Applicants: DENSO CORPORATION, Kariya (JP); Carnegie Mellon University, Pittsburgh, PA (US)

(72) Inventors: Prasanna Sivakumar, Pittsburgh, PA (US); Kris Kitani, Pittsburgh, PA (US); Matthew O'Toole, Pittsburgh, PA (US); Xinshuo Weng, Pittsburgh, PA (US); Shawn Hunt, Bethel Park, PA (US); Yunze Man, Pittsburgh, PA (US)

(73) Assignees: DENSO CORPORATION, Kariya (JP); Carnegie Mellon University, Pittsburgh, PA (US)

( * ) Notice: Subject to any disclaimer, the term of this patent is extended or adjusted under 35 U.S.C. 154(b) by 139 days.

(21) Appl. No.: 17/708,760

(22) Filed: Mar. 30, 2022

(65) Prior Publication Data
US 2023/0114731 A1    Apr. 13, 2023

Related U.S. Application Data

(60) Provisional application No. 63/262,213, filed on Oct. 7, 2021.

(51) Int. Cl.
*G06T 15/20* (2011.01)
(52) U.S. Cl.
CPC ........ *G06T 15/205* (2013.01); *G06T 2210/56* (2013.01)

(58) Field of Classification Search
None
See application file for complete search history.

(56) References Cited

U.S. PATENT DOCUMENTS

| 2014/0210802 A1* | 7/2014 | Myers ................ G09G 3/3426 345/207 |
| 2018/0275658 A1* | 9/2018 | Iandola ................ G06F 30/20 |

(Continued)

OTHER PUBLICATIONS

Incoronato et al., "Statistical modelling of SPADs for time-of-flight LiDAR," Sensors 2021, 21, 4481 (Year: 2021).*

*Primary Examiner* — Anh-Tuan V Nguyen
(74) *Attorney, Agent, or Firm* — Harness, Dickey & Pierce, P.L.C.

(57) ABSTRACT

A method of generating virtual sensor data of a virtual single-photon avalanche diode (SPAD) lidar sensor includes generating a two-dimensional (2D) lidar array having a plurality of cells. The method further includes interpolating image data from a virtual camera with the 2D lidar array to define auxiliary image data, generating a virtual ambient image based on a red-channel (R-channel) data of the auxiliary image data, identifying a plurality of virtual echoes of the virtual SPAD lidar sensor based on the R-channel data and a defined photon threshold, defining a virtual point cloud indicative of virtual photon measurements of the virtual SPAD lidar sensor based on the plurality of virtual echoes, and outputting data indicative of the virtual ambient image, the virtual photon measurements, the virtual point cloud, or a combination thereof, as the virtual sensor data of the virtual SPAD lidar sensor.

15 Claims, 5 Drawing Sheets

(56) References Cited

U.S. PATENT DOCUMENTS

| | | | |
|---|---|---|---|
| 2019/0250257 A1* | 8/2019 | Finkelstein | G01S 7/4863 |
| 2019/0302259 A1* | 10/2019 | Van Fleet | G05D 1/024 |
| 2020/0036918 A1* | 1/2020 | Ingle | H01L 27/14625 |
| 2020/0160598 A1* | 5/2020 | Manivasagam | G05D 1/0231 |
| 2020/0175759 A1* | 6/2020 | Russell | G06F 18/214 |
| 2020/0193686 A1* | 6/2020 | Chong | G06T 15/06 |
| 2020/0301799 A1* | 9/2020 | Manivasagam | G01S 17/006 |
| 2021/0294944 A1* | 9/2021 | Nassar | B60W 50/00 |
| 2022/0035010 A1* | 2/2022 | Caporale | G01S 7/4865 |
| 2022/0366640 A1* | 11/2022 | Lasram | G06T 3/4007 |
| 2023/0080540 A1* | 3/2023 | Unger | G06F 30/27 |
| | | | 356/5.01 |

* cited by examiner

METHODS AND SYSTEM FOR GENERATING VIRTUAL SENSOR DATA OF A VIRTUAL SINGLE-PHOTON AVALANCHE DIODE (SPAD) LIDAR SENSOR OF A VIRTUAL VEHICLE SIMULATOR

CROSS-REFERENCE TO RELATED APPLICATION

This application is a U.S. Patent Application, which claims priority to, and the benefit of U.S. Provisional Patent Application No. 63/262,213 filed on Oct. 7, 2021. The disclosure of the above applications is incorporated herein by reference.

FIELD

The present disclosure relates to simulating operation of a vehicle lidar sensor provided.

BACKGROUND

The statements in this section merely provide background information related to the present disclosure and may not constitute prior art.

A fully-autonomous or partially autonomous vehicle (i.e., autonomous vehicle) is generally a complex system having multiple sensors providing data to different controllers within the vehicle, where the controllers operate various components such as, but not limited to, motors, wheels, brakes, steering components, and/or heating-cooling devices. In recent years, autonomous vehicles include imaging sensors like light detection and ranging (lidar) sensors and/or camera sensors (e.g., red-green-blue (RGB) camera sensor) to capture image data of the environment around the autonomous vehicle. The image data can be used for various operations, such as but not limited to, detecting objects, locating the vehicle with respect to the environment (e.g., lane in which vehicle is traveling, location of detected objects), and mapping a route of the vehicle.

Simulation tools are generally used in various applications for developing and designing vehicles. More particularly, in an example application, a vehicle simulation system is configured to simulate a vehicle traveling along a virtual environment and capture data on how the vehicle responds to different environments or scenarios. For example, a vehicle may operate differently in a city than a rural environment. In another example, response data can be collected on how quickly the vehicle responds to an object appearing in the path of the vehicle. In addition to developing the vehicle, simulation data can also be used to develop specific components, such as, but not limited to, the lidar sensor and camera sensor.

SUMMARY

This section provides a general summary of the disclosure and is not a comprehensive disclosure of its full scope or all of its features.

In one form, the present disclosure is directed to a method of generating virtual sensor data of a virtual single-photon avalanche diode (SPAD) lidar sensor. The method includes generating a two-dimensional (2D) lidar array having a plurality of cells, where each cell is associated with a coordinate indicative of a position of the cell in the 2D lidar array, interpolating image data from a virtual camera with the 2D lidar array to define auxiliary image data, where the auxiliary image data correlates the plurality of cells of the 2D lidar array with a plurality of pixels of the image data, generating a virtual ambient image based on a red-channel (R-channel) data of the auxiliary image data, identifying a plurality of virtual echoes of the virtual SPAD lidar sensor based on the R-channel data and a defined photon threshold, defining a virtual point cloud indicative of virtual photon measurements of the virtual SPAD lidar sensor based on the plurality of virtual echoes, and outputting data indicative of the virtual ambient image, the virtual photon measurements, the virtual point cloud, or a combination thereof, as a virtual sensor data of the virtual SPAD lidar sensor.

In some variations, the method further includes determining a virtual photon measurement for each cell of the plurality of cells based on the R-channel data of the auxiliary image data, and determining a virtual fill factor of the virtual SPAD lidar sensor based on the virtual photon measurements and a Gaussian kernel-based model, where the plurality of echoes are identified based on the virtual fill factor of the virtual SPAD lidar sensor and the defined photon threshold.

In some variations, determining the virtual photon measurement further includes, for each cell of the plurality of cells, determining a number of signal photons for a selected time interval based on a signal photon model and the R-channel data, determining a number of ambient photons based on a normalization of the R-channel over the auxiliary image data, and generate a three-dimensional (3D) tensor photon count for the selected time interval based on the number of signal photons and the number of ambient photons.

In some variations, for each cell of the 2D lidar array, the virtual fill factor of the virtual SPAD lidar sensor is determined based on the 3D tensor photon count and the Gaussian kernel-based model.

In some variations, the image data from the virtual camera includes data indicative of red-green-blue (RGB) image, a depth image, and a surface normal image.

In some variations, the method further includes determining a virtual fill factor of the virtual SPAD lidar sensor based on the R-channel data for the plurality of cells and a Gaussian kernel-based model, where the plurality of echoes are determined based on the virtual fill factor of the virtual SPAD lidar sensor and the defined photon threshold.

In some variations, the method further includes determining a virtual photon measurement for each cell of the plurality of cells based on the R-channel data of the auxiliary image data, wherein the virtual photon measurement is indicative of a signal photon and an ambient photon.

In some variations, the image data from the virtual camera includes data indicative of red-green-blue (RGB) image, a depth image, and a surface normal image, and determining the virtual photon measurement further includes: determining a number of signal photons for a selected time interval based on a signal photon model, the R-channel data of the RGB image, and data indicative of the depth image; determining a number of ambient photons based on a normalization of the R-channel data over the auxiliary image data; and generate a three-dimensional (3D) tensor photon count for the selected time interval based on the number of signal photons and the number of ambient photons.

In some variations, identifying the plurality of virtual echoes of the virtual SPAD lidar sensor further includes sorting values of a photon count for the selected time interval in descending order, selecting top-K photon counts from among the photon counts arranged in descending order, where K is a number greater than one, determining whether a selected photon count from among the top-K photon counts is less than the defined photon threshold, removing the selected photon count from among the top-K photon counts in response to the selected photon count being less than the defined photon threshold, and identifying the selected photon count as a virtual echo for the plurality of virtual echoes in response to the selected photon count being greater than the defined photon threshold.

In some variations, the method further includes outputting the virtual sensor data to a vehicle simulator, where the vehicle simulator simulates a virtual vehicle having the virtual SPAD lidar sensor.

In one form the present disclosure is directed to a simulation system of a virtual single-photon avalanche diode (SPAD) lidar sensor, the simulation system includes one or more processors and one or more nontransitory computer-readable mediums storing instructions that are executable by the one or more processors. The instructions includes: generating a two-dimensional (2D) lidar array having a plurality of cells, where each cell is associated with a coordinate indicative of a position of the cell in the 2D lidar array; interpolating image data from a virtual camera with the 2D lidar array to define auxiliary image data, where the auxiliary image data correlates the plurality of cells of the 2D lidar array with a plurality of pixels of the image data, generating a virtual ambient image based on a red-channel (R-channel) data of the auxiliary image data, identifying a plurality of virtual echoes of the virtual SPAD lidar sensor based on the R-channel data and a defined photon threshold, defining a virtual point cloud indicative of virtual photon measurements of the virtual SPAD lidar sensor based on the plurality of virtual echoes, and simulating operation of a digital having the virtual SPAD lidar sensor based on virtual sensor data of the virtual SPAD lidar sensor, where the virtual sensor data includes data indicative of the virtual ambient image, the virtual photon measurements, the virtual point cloud, or a combination thereof.

In some variations, the instructions further include determining a virtual photon measurement for each cell of the plurality of cells based on the R-channel data of the auxiliary image data, and determining a virtual fill factor of the virtual SPAD lidar sensor based on the virtual photon measurements and a Gaussian kernel-based model, where the plurality of echoes are identified based on the virtual fill factor of the virtual SPAD lidar sensor and the defined photon threshold.

In some variations, the instructions of determining the virtual photon measurement further includes, for each cell of the plurality of cells determining a number of signal photons for a selected time interval based on a signal photon model and the R-channel data, determining a number of ambient photons based on a normalization of the R-channel over the auxiliary image data, and generate a three-dimensional (3D) tensor photon count for the selected time interval based on the number of signal photons and the number of ambient photons.

In some variations, for each cell of the 2D lidar array, the virtual fill factor of the virtual SPAD lidar sensor is determined based on the 3D tensor photon count and the Gaussian kernel-based model.

In some variations, the image data from the virtual camera includes data indicative of red-green-blue (RGB) image, a depth image, and a surface normal image.

In some variations, the instructions further includes determining a virtual fill factor of the virtual SPAD lidar sensor based on the R-channel data for the plurality of cells and a Gaussian kernel-based model, where the plurality of echoes are determined based on the virtual fill factor of the virtual SPAD lidar sensor and the defined photon threshold.

In some variations, the instructions further includes determining a virtual photon measurement for each cell of the plurality of cells based on the R-channel data of the auxiliary image data, wherein the virtual photon measurement is indicative of a signal photon and an ambient photon.

In some variations, the image data from the virtual camera includes data indicative of red-green-blue (RGB) image, a depth image, and a surface normal image. The instructions for determining the virtual photon measurement further includes determining a number of signal photons for a selected time interval based on a signal photon model, the R-channel data of the RGB image, and data indicative of the depth image, determining a number of ambient photons based on a normalization of the R-channel data over the auxiliary image data, and generating a three-dimensional (3D) tensor photon count for the selected time interval based on the number of signal photons and the number of ambient photons.

In some variations, the instructions of identifying the plurality of virtual echoes of the virtual SPAD lidar sensor further comprises sorting values of a photon count for the selected time interval in descending order, selecting top-K photon counts from among the photon counts arranged in descending order, where K is a number greater than one, determining whether a selected photon count from among the top-K photon counts is less than the defined photon threshold, removing the selected photon count from among the top-K photon counts in response to the selected photon count being less than the defined photon threshold, and identifying the selected photon count as a virtual echo for the plurality of virtual echoes in response to the selected photon count being greater than the defined photon threshold.

In one form, the present disclosure is directed to a method of generating virtual sensor data of a virtual single-photon avalanche diode (SPAD) lidar sensor. The method includes generating a two-dimensional (2D) lidar array having a plurality of cells, wherein each cell is associated with a coordinate indicative of a position of the cell in the 2D lidar array, and interpolating image data from a virtual camera with the 2D lidar array to define auxiliary image data, where the image data from the virtual camera includes data indicative of red-green-blue (RGB) image, a depth image, and a surface normal image. wherein the auxiliary image data correlates the plurality of cells of the 2D lidar array with a plurality of pixels of the image data. The method further includes generating a virtual ambient image based on a red-channel (R-channel) data of the auxiliary image data, determining a virtual photon measurement for each cell of the plurality of cells based on the R-channel data of the auxiliary image data, determining a virtual fill factor of the virtual SPAD lidar sensor based on the virtual photon measurements and a Gaussian kernel-based model, identifying a plurality of virtual echoes of the virtual SPAD lidar sensor based on the virtual fill factor and a defined photon threshold, defining a virtual point cloud indicative of virtual photon measurements of the virtual SPAD lidar sensor based on the plurality of virtual echoes, and outputting data indicative of the virtual ambient image, the virtual photon measurements, the virtual point cloud, or a combination thereof, as a virtual sensor data of the virtual SPAD lidar sensor.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Vehicle simulation systems may be defined to be as authentic to real-world vehicle systems as possible, especially since data provided by the vehicle simulation system may be used to design and develop real vehicles and/or components within the vehicle. The accuracy of the simulated vehicle can depend on the accuracy of virtual components of the simulated vehicle, such as a virtual lidar sensor.

Figure 1:
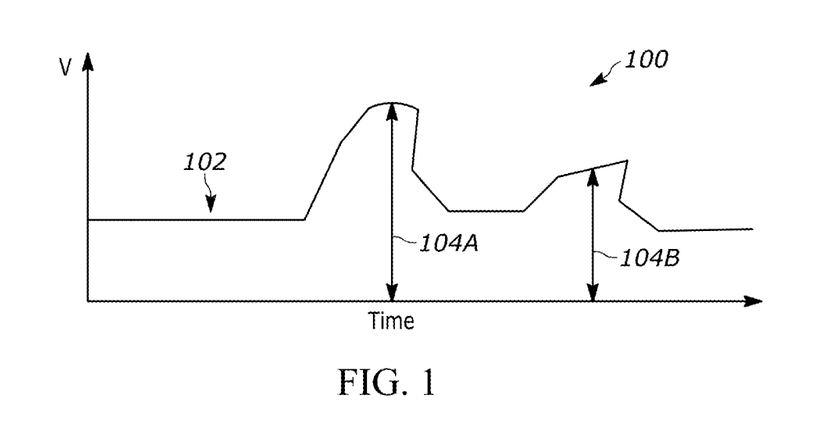
FIG. 1 is a graph of an example voltage pulse detected by a SPAD lidar sensor in accordance with the present disclosure.

Lidar sensors are going through technological improvements to provide enhanced data regarding the environment around the vehicle. For example, as suggested in its name, an actual or real single photon avalanche diodes (SPAD) lidar sensor includes single photon avalanche diodes that not only capture return signals from objects, but also natural sunlight (ambient light) reflected by the object. Accordingly, the SPAD lidar sensor is operable to provide data regarding two types of photons: (1) ambient photons that are representative of the ambient light reflected by the object; and (2) signal photons that are representative of return signal(s) that are reflected laser beams of K-different echoes ("K" is a number greater than or equal to 1). For example, referring to FIG. 1, returning photons excite a SPAD generating a voltage pulse (generally identified with reference number 100). A baseline voltage corresponds to excitation caused by ambient photons (generally identified with reference number 102) and distinct voltage peaks indicate return signals/beam splitting (generally identified with reference number 104A and 104B, and here K=2). The value of the peak corresponds to the reflectivity of the object or specifically, intensity of the reflected laser beam (i.e., the reflected laser beam may also be referred to as a returned signal). The time difference between the start of capturing of photons to a peak corresponds to the distance of the object. Data indicative of the voltage pulse 100 can be used to determine ambient values, K-different intensity values, and K-different depth values.

The real SPAD lidar can be described as having one or more of the following operational characteristics: a fill factor, multi-echo return of a single laser beam, an ambient image generator, and a photon counter to define a three-dimensional (3D) point cloud with intensity data and ambient light data. In one form, the real SPAD lidar sensor is defined by multiple pairs of transmitters and receivers that can be viewed as being arranged in a two-dimensional (2D) array. Each cell of the 2D array is associated with a single transmitter-receiver pair, and the fill factor characterizes the ability of a laser beam from the transmitter to fill-up the cell. As the beam size increases, the gap between consecutive beams decreases, but the amount of power needed increases. In an example application, a nominal fill factor provides a strength of the laser beam being greatest at a center of the cell and decreasing from the center to edges of the cell.

A single beam emitted by a diode may return multiple echoes that are indicative of multiple returns of distances from multiple different objects along the path of the laser beam. The multiple echoes may be caused when the laser beam hits a contour of an object, and therefore it may be determined that the laser beam has hit an edge of an object when multiple echoes are detected. In one form, the real SPAD lidar sensor is configured to assign the echoes to a specific group based on one or more factors, such as but not limited to, distance and/or intensity.

While advancements are being made to real lidar sensors, development in lidar sensor models employed for simulation may not provide authentic representation of the real lidar sensor. Accordingly, an inaccurate lidar sensor model can hinder the simulation of a virtual vehicle.

The present disclosure is directed to a method and/or system of generating virtual sensor data of a virtual single-photon avalanche diode (SPAD) lidar sensor. More particularly, the virtual SPAD lidar sensor is configured to have operational characteristics similar to those of a real SPAD lidar sensor and thus, output virtual sensor data similar to that of the real SPAD lidar sensor.

Figure 2:
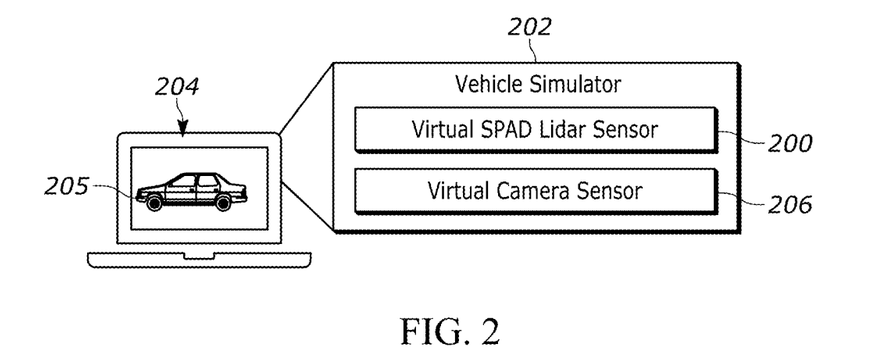
FIG. 2 illustrates computing device with a vehicle simulator having a virtual SPAD lidar sensor in accordance with the present disclosure.
Figure 3:
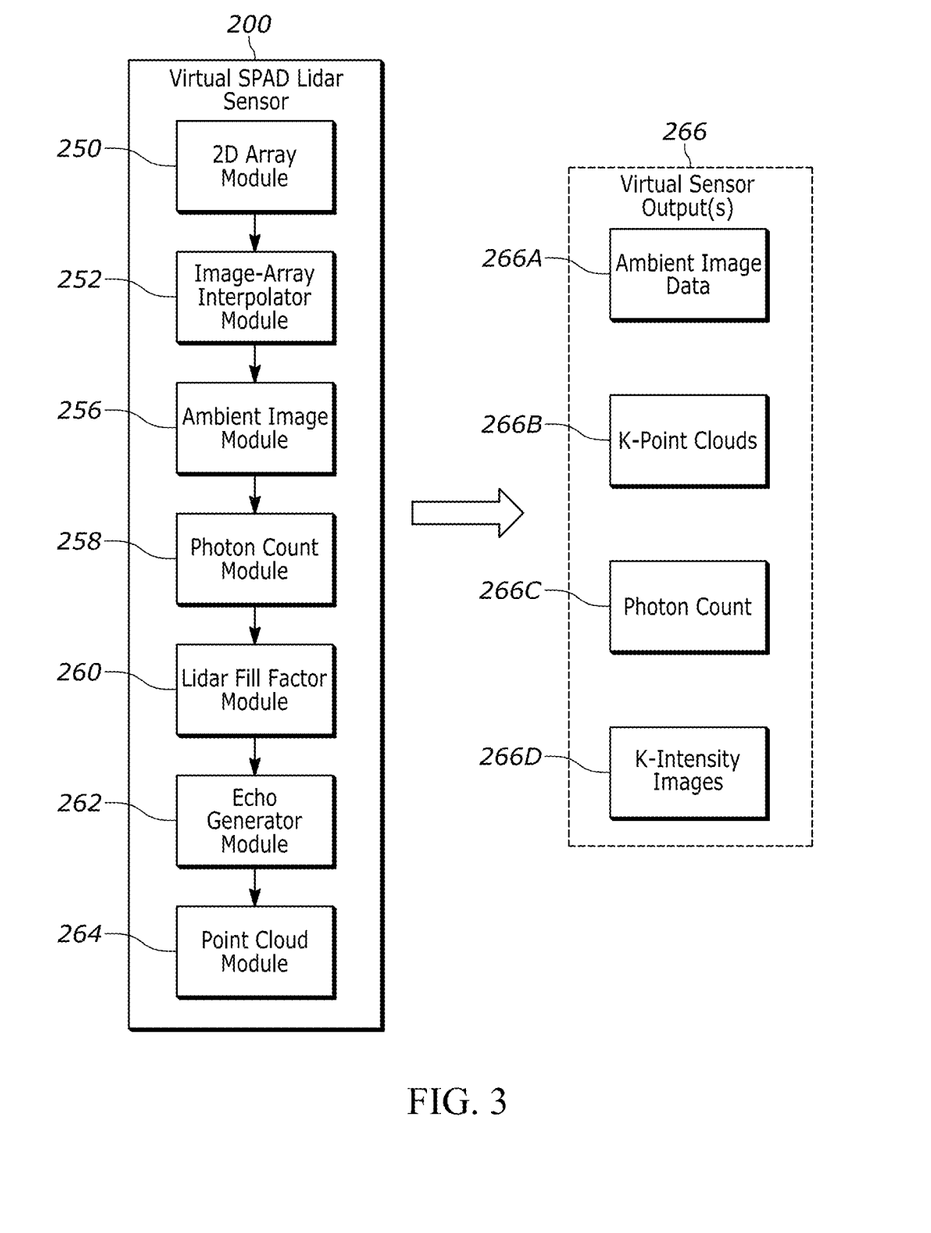
FIG. 3 is an example block diagram of the virtual SPAD lidar sensor in accordance with the present disclosure.

Referring to FIGS. 2 and 3, in an example application, a virtual SPAD lidar sensor 200 of the present disclosure is provided as part of a vehicle simulator 202, which is executable by a computing device 204 such as, but not limited to, a desktop computer, a laptop, a tablet. In one form, the vehicle simulator 202 is provided computer readable instructions that are stored and processed by the computing device 204. It should be readily understood that while the vehicle simulator 202 and the virtual SPAD lidar sensor 200 are provided as being stored on the computing device 204, the vehicle simulator 202 and/or and the virtual SPAD lidar sensor 200 may be stored at a remote server that is accessible via the computing device 204 and a communication network that communicably links the computing device 204 to the remote server.

In one form, the vehicle simulator 202 is configured to simulate a vehicle 205 driving along defined environment to capture data on how the vehicle may respond. As part of the architecture, the vehicle simulator 202 simulates performance of the vehicle 205 based on data from simulated sensors provided on the vehicle 205, such as the virtual SPAD lidar sensor 200. In one form, the simulated sensors also includes a virtual camera sensor 206 that is configured to provide image data indicative of a red-green-blue (RGB) image (I-RGB) and a depth image (I-Dep) for each pixel of the RGB image. In addition to the RGB image and the depth image, the virtual camera 206 may also provide a surface normal image (I-SN) that provides surface normal values for each pixel of the RGB image. In one form, the RGB image, the depth image, and the surface normal images are provided for the same environmental scene, and may collectively referred to as "image inputs" (I-IN). In the event, the surface normal image is not provided, known enhanced surface normal algorithms may be used to output the surface normal values for the pixels. Details regarding the virtual camera sensor 206 is outside the scope of the present disclosure, and therefore is not discussed herein.

In one form, as provided in FIG. 3, the virtual SPAD lidar sensor 200 includes a two-dimensional (2D) array module 250, an image-array interpolator module 252, an ambient image module 256, a photon count module 258, a lidar fill factor module 260, an echo generator module 262, and a point cloud module 264. As described herein, the virtual SPAD lidar sensor 200 is configured to generate various virtual sensor outputs 266 such as ambient image data 266A, K-point clouds 266B, photon counts 266C and K-intensity images 266D. In the example application, the virtual sensor data 266 may be outputted to other modules of the vehicle simulator to simulate operation of the virtual vehicle having the virtual SPAD lidar sensor 200.

Figure 4A:
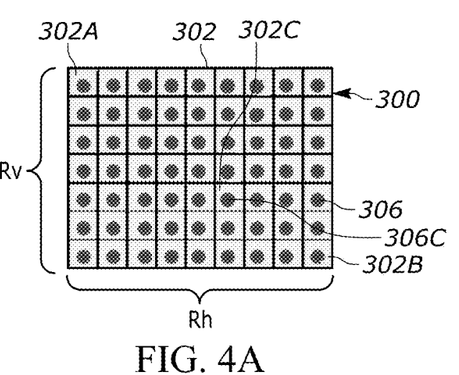
FIGS. 4A and 4B illustrate examples of a two-dimensional (2D) lidar array of the virtual SPAD lidar sensor in accordance with the present disclosure.
Figure 4B:
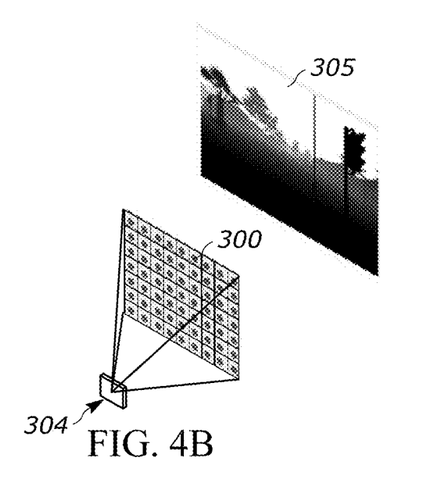

In one form, the 2D array module 250 is configured to generate a two-dimensional (2D) lidar array having a plurality of cells, where each cell is associated with a coordinate indicative of a position of the cell in the 2D lidar array. Specifically, the real SPAD lidar sensor generally spins on an axis and emits lasers or more generally, light beams into the environment and detects returned light beams. The 2D array module 250 is configured to simulate a grid of virtual detectors, where each virtual detector is formed by a transmitter and a receiver. A selected virtual detector emits the light beams from a fixed azimuth (i.e., horizontal) and elevation (i.e., vertical) angles. For example, referring to FIGS. 4A and 4B, the 2D array module 250 is configured to define a 2D lidar array 300 having a plurality of cells 302. The 2D array module 250 is configured to approximate a position of the virtual SPAD lidar 200 as a point in a 3D space that is located near or at the virtual camera sensor 206 (position of virtual SPAD lidar 200 generally represented by reference number 304). In FIG. 4B, an example camera image 305 provided by the virtual camera sensor 206 is illustrated in relation to the 2D lidar array 300. In FIGS. 4A and 4B, the virtual detectors are generally represented by circle 306 in a cell 302. Virtual detectors 306 of the virtual SPAD lidar 200 form a sensor array having a defined number of vertically aligned virtual detectors (i.e., Rv) and a defined number of horizontally aligned virtual detectors during a single rotation (i.e., Rh). In other words, "Rv" represents the number of lines that the virtual SPAD lidar 200 generates along a vertical axis and Rh represents the number of discrete horizontal locations where Rv number of light beams are emitted from. In one form, the value of Rv and Rh can be defined by a user of the vehicle simulator 202, and can be any suitable value and should not be limited to example provided in the figures.

The 2D array module 250 is configured to define the 2D lidar array as a Rv×Rh array, where the virtual SPAD lidar sensor 200 is defined to generate "Rv×Rh" number of points per time-step (i.e., in the example of FIG. 4A, the Rv×Rh=7×9=63). Accordingly, the 2D array module 250 provides a Rv×Rh 2D lidar array, where each cell of the 2D lidar array is denoted by coordinates (i.e., coordinates (i,j), where i∈[1, Rv] and j∈[1, Rh]). For example, in FIG. 4A a cell 302A has coordinates of (0,0), a cell 302B has coordinates (6,8), and a cell 302C has coordinates (4, 5). In one form, the coordinates for each cell of the 2D lidar array are represented by vectors associated with a respective virtual detector of the virtual SPAD lidar 200 (i.e., coordinates (i,j)=(θi, γj), θi, γj∈[0, 2Π]). For example, a virtual detector 306C associated with the cell 302C at (4, 5) provides an elevation of 4 degrees by 25 degrees. The vectors for each cell are predefined according to a desired vertical and horizontal field of view and resolution of the virtual SPAD lidar sensor 200. In one form, the difference between θi and θi+1 represents a vertical angular resolution and the difference between γj and γj+1 represents the horizontal angular resolution of the virtual SPAD lidar sensor 200.

Figure 5A:
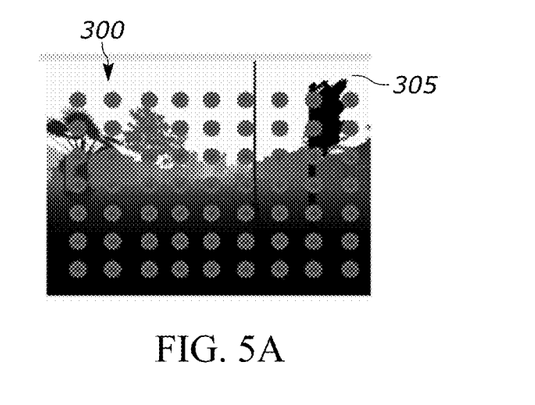
FIGS. 5A, 5B, and 5C illustrate examples of interpolation of the 2D lidar array with camera images in accordance with the present disclosure.
Figure 5B:
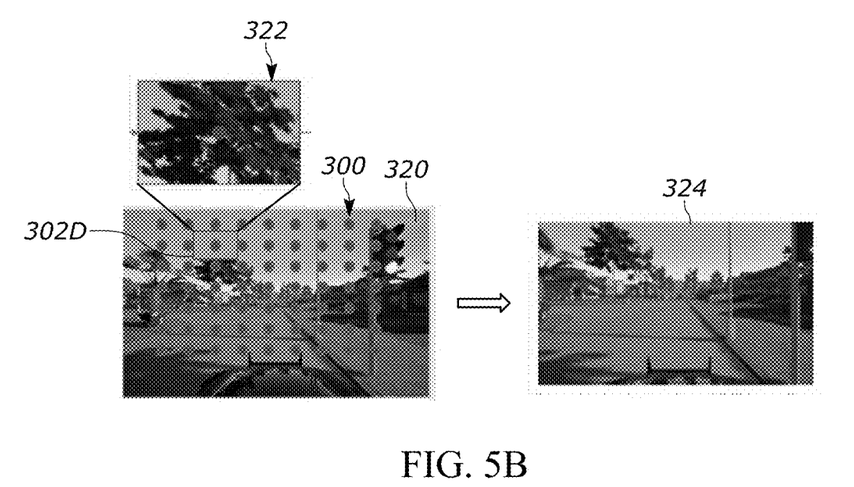
Figure 5C:
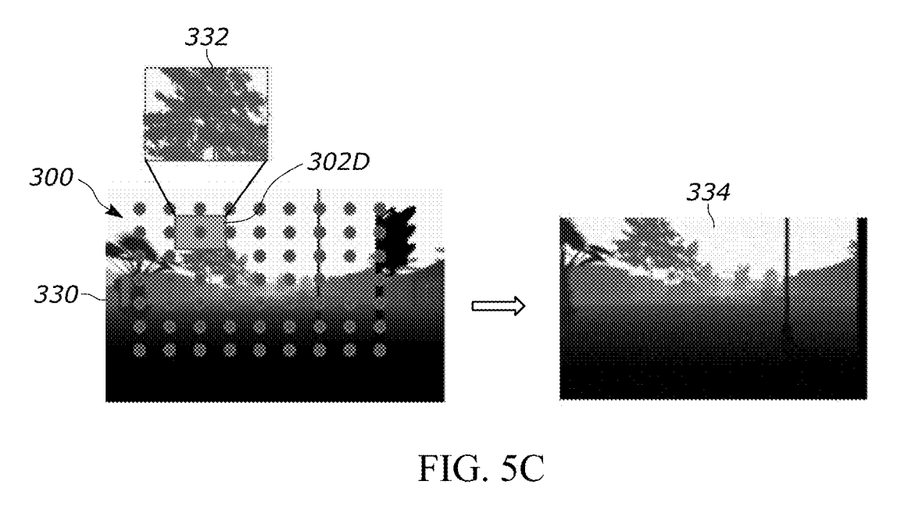

The image-array interpolator module 252 is configured to interpolate image data from the virtual camera sensor 206 with the 2D lidar array to define an auxiliary image data, where the auxiliary image data correlates the plurality of cells of the 2D lidar array with a plurality of pixels of the image data. More particularly, in one form, the image-array interpolator module 252 is configured project the 2D lidar array to 2D images from the virtual camera sensor 206 (e.g., RGB-image, intensity image, and/or depth image). The image-array interpolator module 252 samples and interpolates pixels of the input images with the 2D lidar array to generate the auxiliary image data. For example, referring to FIG. 5A the image-array interpolator module 252 projects or overlays the 2D lidar array 300 to the camera image 305 (FIG. 5A). Areas of the input images outside of the cells of the 2D lidar array are removed forming the auxiliary image for the input image. For example, FIG. 5B illustrates an RGB image 320 with the 2D lidar array 300 overlayed thereon. The image-array interpolator module 252 samples a portion of the RGB image 320 that is within the cells 302D, which is represented in enhanced box 322. With each cell 302 sampling a respective portion of the RGB image 320, the image-array interpolator module 252 is configured to generate an auxiliary RGB image 324. In another example, FIG. 5C illustrates a depth image 330 with the 2D lidar array 300 overlayed thereon. The image-array interpolator module 252 samples a portion of the depth image 330 that is within the cell 302D, which is represented in enhanced box 332. With each cell 302 sampling a respective portion of the depth image 330, the image-array interpolator module 252 is configured to generate an auxiliary depth image 334. In one form, the auxiliary image data may be represented as "Aux I-IN" where, Aux I-IN can include an auxiliary RGB image ("Aux I-RGB"), an auxiliary depth image ("Aux I-Dep"), and/or auxiliary surface normal image ("Aux I-SN").

The ambient image module 256 is configured to generate a virtual ambient image based on a red-channel (R-channel) data of the auxiliary image data, and more particularly, the R-channel data of the auxiliary RGB image. In real-world applications, the ambient light detected by the real SPAD lidar sensor is sunlight reflected by objects. Accordingly, data indicative of the ambient light is substantially similar to that collected by an RGB camera. That is, the wavelength of the color red is approximately in the same wavelength range as that of ambient light captured by the real SPAD lidar sensor. Thus, the ambient image module 256 is configured to employ data indicative of the R-channel of the auxiliary RGB image to provide the ambient image data 266A for a virtual ambient image.

The photon count module 258 is configured to determine a virtual photon measurement for each cell of the 2D lidar array based on the R-channel data of the auxiliary image data. In one form, the virtual photon measurement is indicative of a signal photon and an ambient photon for each cell of the 2D lidar array. More particularly, as described above, the real SPAD LiDAR sensor measures a time-of-flight of photons and to simulate the photon measurement, the photon count module 258 is configured to determine the number of photons received (i.e., "Np" number of received photons) employing a temporal histogram represented by equation 1 below in which "n" is the nth time interval along the temporal axis, "N-sig[n]" is the number of detected signal photons at the nth time interval, "Namb[n]" is the number of ambient photons at the nth interval, and function "P ( )" is a Poisson distribution. Based on equation 1, the photon count module 258 generates a 3D tensor of photon counts $N_p$ [Rv, Rh, N] representing the number of photons detected by the virtual SPAD lidar sensor 200, where N represents the number of time intervals based on the number of signal photons and the number of ambient photons.

$$Np[n]\sim P(Nsig[n]+Namb[n]) \qquad \text{Equation 1}$$

In one form, the photon count module 258 is configured to determine the number of signal photons for a selected time interval based on a signal photon model, the R-channel data from the auxiliary RGB image (Aux-I RGB, "Aux I+R" is R-Channel data of Aux-I RGB), and/or data indicative of the auxiliary depth image (Aux I-Dep). To determine the number of signal photons (Nsig[n]), the signal photon model is defined under the assumption that all transmitters of the virtual SPAD lidar sensor 200 emit light beams at the same energy (i.e., emit same number of photons) and takes into consideration a surface reflectance, an angle of incidence during reflection, and radial attenuation. In one form, the signal photon model employs equation 2 below for providing the number of signal photons. In equation 2, "Norm" operation means to normalize over the whole image (i.e., divide by the average value in the entire image), "SBR" is the signal-background-ratio used to control relative strength between signal and background light, and "n*" is a time interval during which the signal light is reflected by the surface, and "h" and "w" are the height and width of a Gaussian kernel, respectively. I $$Nsig(h,w,n) \sim \begin{cases} Norm\left(SBR \times \dfrac{Aux\ I - R(h,w)\cos\theta}{Aux\ I - Dep(h,w)^2}\right) & \text{if } n = n* \\ 0 & \text{if } n \neq n* \end{cases} \qquad \text{Equation 2}$$

More particularly, using, Lambert's cosine law, the signal photon model is defined to have a reflected energy proportional to cos (ϑ), where ϑ is the incidence angle of the light beam with respect to a surface. The reflected energy is provided by the auxiliary surface normal image (Aux I-SN) (i.e., data indicative of the Aux I-SN). In one form, the signal photon model is configured to use the R-channel data of the auxiliary RGB image (i.e., "Aux I-R") to approximate the reflectance of the surface or in other words, approximate the value of a measured intensity value, which is represented in equation 2. The radial attenuation of light energy is proportional to the square of travel distance, and thus, the signal photon model is configured to use data of the auxiliary depth image (i.e., Aux I-Dep) to account for the radial attenuation of the light, as demonstrated in equation 2.

To model the number of ambient photons Namb[n], the photon count module 258 is configured to normalize the R-channel of the auxiliary RGB image (Aux I-R) over the whole auxiliary RGB image. For example, the number of ambient photons can be determined using equation 3 below.

Using equation 1 with equations 2 and 3, the photon count module 258 is configured to simulate a 3D tensor of photon number Np [Rv, Rh, N].

$$Namb(h,w,n) \sim Norm(Aux\ I\text{-}R[h,w]), \forall n \in [1,N] \qquad \text{Equation 3}$$

In one form, the lidar fill factor module 260 is configured to determine a virtual fill factor of the virtual SPAD lidar sensor 200 based on a Gaussian kernel-based model and the virtual photon measurements, and more specifically, on the 3D tensor photon count. More particularly, for the real SPAD lidar sensor, multiple echoes typically occur because transmitted light beams have a wider coverage of the 3D space instead of a perfect 2D line. When there is high fill factor, there is little to no gap between 2 consecutive light beams. In one form, the lidar fill factor module 260 is configured to employ a Gaussian kernel function (i.e., "G( )") to simulate spatial coverage of the virtual SPAD lidar sensor 200 based on a fill factor of a real SPAD lidar sensor. Specifically, the number of photons in a given time interval is a weighted sum of its spatial neighborhood bins (not temporal ones), with nearer neighbors contributing more. That is, equation 4 below represents the virtual fill factor, where "N*p[h, w, n]" is a weighted 3D tensor of photon number, "N(h,w)" is a neighborhood of a given position on the image plane, G(kh, kw) is the Gaussian weight function over the distance between a given 2D position (Rh, Rw) and its neighbor position (Kh, Kw), and "Np[h,w,n]" 3D tensor of photon number. The parameters of the Gaussian kernel function is used to control the spatial coverage of the laser/light beam.

$$N_p^*[h,w,n] = \sum\sum_{(h,w)\in \mathcal{N}(h,w)} G(k_h,k_w)\cdot N_p[h,w,n] \qquad \text{Equation 4}$$

In one form, the echo generator module 262 is configured to identify a plurality of virtual echoes detected by the virtual SPAD lidar sensor 200 based on the R-channel data of the auxiliary RBG image and a defined photon threshold. More particularly, the real SPAD lidar may have a large spatial coverage, where each light beam is able to cover a large 3D volume such that the light beam hits or reflects from more than one target. These multiple reflections for a signal light beam are represented as multiple strong peaks along a temporal histogram.

In one form, the plurality of virtual echoes are determined based on the virtual fill factor of the virtual SPAD lidar sensor 200 and the defined photon threshold. Specifically, the echo generator module 262 is configured to identify the plurality of virtual echoes by sorting values of a photon count for the selected time interval in descending order and select top-K photon counts from among the photon counts arranged in descending order, where K is a number greater than zero. The echo generator module 262 further determines whether a selected photon count from among the top-K photon counts is less than the defined photon threshold and removes the selected photon count from among the top-K photon counts in response to the selected photon count being less than the defined photon threshold. The echo generator module 262 identifies the selected photon count as a virtual echo for the plurality of virtual echoes in response to the selected photon count being greater than the defined photon threshold. In an example application, the operation of the echo generator module 262 can be represented by equation 5 in which "Np*[Rv, Rh, K]" is photon number for echo specified by Rv, Rh, K; "K" is a number greater than 0; "S ( )" is a sort function that sorts the number of photon counts in descending order along a temporal axis N; and "T( )" is a threshold function that masks out echoes having a photon count less than a threshold.

$$Np*[Rv,Rv,K]=T(S(Np*[Rv,Rh,N])[:,:,:K]) \qquad \text{Equation 5}$$

In one form, the point cloud module 264 is configured to determine a virtual point cloud indicative of virtual photon measurements of the virtual SPAD lidar sensor 200 based on the plurality of virtual echoes. The point cloud module 264 is configured to convert photon counts to K-number of point clouds (i.e., K-point clouds 266B) and K-number of intensity images (i.e., K-intensity images 266D). In one form, the point cloud module 264 is configured to convert the echo photon counts to point clouds by back projecting the photon counts in 3D space, where each echo group is associated with a position in the 2D lidar array as represented as Rv and Rh in "Np*[Rv, Rh, K]." The number of valid points is fewer when K is higher. That is, the first strongest point cloud may have more points than the second strongest point cloud and so on. After obtaining the multi-echo point cloud, the point cloud module 264 is configured to determine the reflectance of each point by normalizing the number of points inside the bins since it is assumed each virtual detector emits same number of photons. The point cloud module 264 is configured to rearrange the reflectance values of the multi-echo point cloud to generate intensity images.

The virtual SPAD lidar sensor 200 of the present disclosure simulates operational characteristic of a real SPAD LiDAR sensor and thus, can improve the accuracy and authenticity of the virtual sensor data employed by other modules of, the vehicle simulator. For example, the virtual SPAD lidar sensor 200 simulates both ambient and signal photons, determines photon counts which is employed to simulate fill factor and to identify echoes, and generates or forms point clouds having the echoes and intensity image(s).

Figure 6:
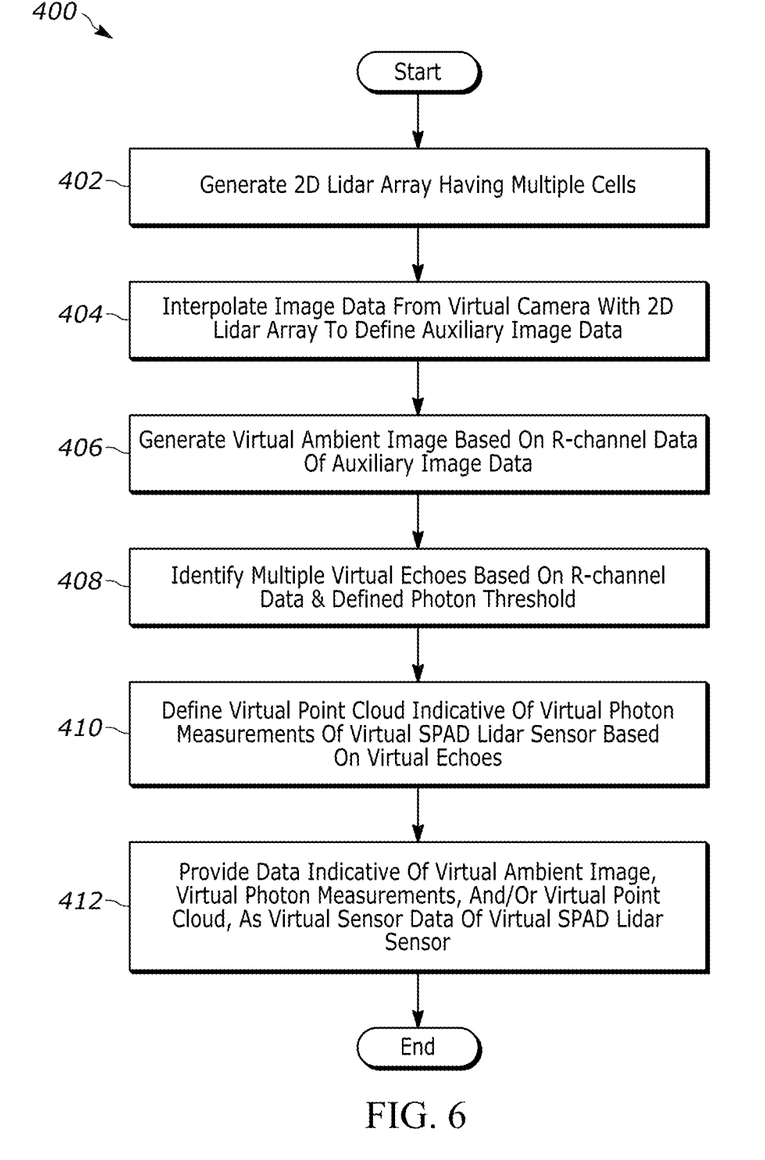
FIG. 6 is a flowchart of an example virtual SPAD lidar operation routine in accordance with the present disclosure.

Referring to FIG. 6, an example virtual SPAD lidar operation routine 400 is provided in accordance with the present disclosure. In one form, the virtual SPAD lidar operation routine 400 is performed by the virtual SPAD lidar sensor 200 in response to a module of the vehicle simulator 202 requesting virtual sensor data from the virtual SPAD lidar sensor 200. At 402, the virtual SPAD lidar sensor 200 is configured to generate a 2D lidar array having multiple cells. Each cell of the 2D lidar array is associated with a coordinate indicative of a position of the cell in the 2D lidar array. At 404, the virtual SPAD lidar sensor 200 is configured to interpolate image data from the virtual camera with the 2D lidar array to define auxiliary image data. At 406, the virtual SPAD lidar sensor 200 is configured to generate virtual ambient image based on R-channel data of the auxiliary image data and more specifically, of an auxiliary RGB image.

At 408, the virtual SPAD lidar sensor 200 is configured to identify multiple virtual echoes based on the R-channel data and a defined photon threshold. More particularly, as described in detail above, the virtual SPAD lidar sensor 200 is configured to determine a virtual photon measurement for each cell of the 2D lidar array based on the R-channel data of the auxiliary image data and further determine a virtual fill factor based on the virtual photon measurements and a Gaussian kernel-based model. The echoes are identified based on the virtual fill factor of the virtual SPAD lidar sensor and the defined photon threshold. At 410, the virtual SPAD lidar sensor 200 is configured to define a virtual point cloud indicative of virtual photon measurements of the virtual SPAD lidar sensor based on the virtual echoes. At 412, the virtual SPAD lidar sensor 200 is configured to provide data indicative of virtual ambient image, virtual photon measurements, and/or virtual point cloud, as virtual sensor data. The virtual sensor data can be provided to other modules to, for example, identify objects around the virtual vehicle, determine drive lane of the virtual vehicle, among other determinations for further determining a response of the virtual vehicle.

It should be readily understood that the routine 400 can configured in various suitable ways and should not be limited to the example provided herein.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of generating virtual sensor data of a virtual single-photon avalanche diode (SPAD) lidar sensor, comprising:
   generating a two-dimensional (2D) lidar array having a plurality of cells, wherein each cell is associated with a coordinate indicative of a position of the cell in the 2D lidar array;
   interpolating image data from a virtual camera with the 2D lidar array to define auxiliary image data, wherein the auxiliary image data correlates the plurality of cells of the 2D lidar array with a plurality of pixels of the image data;
   generating a virtual ambient image based on a red-channel (R-channel) data of the auxiliary image data;
   identifying a plurality of virtual echoes of the virtual SPAD lidar sensor based on the R-channel data and a defined photon threshold;
   defining a virtual point cloud indicative of virtual photon measurements of the virtual SPAD lidar sensor based on the plurality of virtual echoes;
   determining a virtual photon measurement for each cell of the plurality of cells based on the R-channel data of the auxiliary image data; and
   determining a virtual fill factor of the virtual SPAD lidar sensor based on the virtual photon measurements and a Gaussian kernel-based model, wherein the plurality of virtual echoes is identified based on the virtual fill factor of the virtual SPAD lidar sensor and the defined photon threshold;
   determining the virtual photon measurement further comprises, for each cell of the plurality of cells:
   determining a number of signal photons for a selected time interval based on a signal photon model and the R-channel data;
   determining a number of ambient photons based on a normalization of the R-channel over the auxiliary image data; and
   generate a three-dimensional (3D) tensor photon count for the selected time interval based on the number of signal photons and the number of ambient photons;
   outputting data indicative of the virtual ambient image, the virtual photon measurements, the virtual point cloud, or a combination thereof, as a virtual sensor data of the virtual SPAD lidar sensor.

2. The method of claim 1, wherein, for each cell of the 2D lidar array, the virtual fill factor of the virtual SPAD lidar sensor is determined based on the 3D tensor photon count and the Gaussian kernel-based model.

3. The method of claim 1, wherein the image data from the virtual camera includes data indicative of red-green-blue (RGB) image, a depth image, and a surface normal image.

4. The method of claim 1 further comprising determining a virtual fill factor of the virtual SPAD lidar sensor based on the R-channel data for the plurality of cells and a Gaussian kernel-based model, wherein the plurality of virtual echoes is determined based on the virtual fill factor of the virtual SPAD lidar sensor and the defined photon threshold.

5. The method of claim 1 further comprising determining a virtual photon measurement for each cell of the plurality of cells based on the R-channel data of the auxiliary image data, wherein the virtual photon measurement is indicative of a signal photon and an ambient photon.

6. The method of claim 1 further comprising outputting the virtual sensor data to a vehicle simulator, wherein the vehicle simulator simulates a virtual vehicle having the virtual SPAD lidar sensor.

7. A method of generating virtual sensor data of a virtual single-photon avalanche diode (SPAD) lidar sensor, comprising:
   generating a two-dimensional (2D) lidar array having a plurality of cells, wherein each cell is associated with a coordinate indicative of a position of the cell in the 2D lidar array;
   interpolating image data from a virtual camera with the 2D lidar array to define auxiliary image data, wherein the auxiliary image data correlates the plurality of cells of the 2D lidar array with a plurality of pixels of the image data;
   generating a virtual ambient image based on a red-channel (R-channel) data of the auxiliary image data;
   identifying a plurality of virtual echoes of the virtual SPAD lidar sensor based on the R-channel data and a defined photon threshold;
   defining a virtual point cloud indicative of virtual photon measurements of the virtual SPAD lidar sensor based on the plurality of virtual echoes;
   determining a virtual photon measurement for each cell of the plurality of cells based on the R-channel data of the auxiliary image data, wherein the virtual photon measurement is indicative of a signal photon and an ambient photon; the image data from the virtual camera includes data indicative of red-green-blue (RGB) image, a depth image, and a surface normal image, and
   determining the virtual photon measurement further comprises:
   determining a number of signal photons for a selected time interval based on a signal photon model, the R-channel data of the RGB image, and data indicative of the depth image;
      determining a number of ambient photons based on a normalization of the R-channel data over the auxiliary image data; and
      generate a three-dimensional (3D) tensor photon count for the selected time interval based on the number of signal photons and the number of ambient photons;
   outputting data indicative of the virtual ambient image, the virtual photon measurements, the virtual point cloud, or a combination thereof, as a virtual sensor data of the virtual SPAD lidar sensor.

8. The method of claim 7, wherein identifying the plurality of virtual echoes of the virtual SPAD lidar sensor further comprises:
   sorting values of a photon count for the selected time interval in descending order;
   selecting top-K photon counts from among the photon counts arranged in descending order, where K is a number greater than one;
   determining whether a selected photon count from among the top-K photon counts is less than the defined photon threshold;
   removing the selected photon count from among the top-K photon counts in response to the selected photon count being less than the defined photon threshold; and
   identifying the selected photon count as a virtual echo for the plurality of virtual echoes in response to the selected photon count being greater than the defined photon threshold.

9. A simulation system of a virtual single-photon avalanche diode (SPAD) lidar sensor, the simulation system comprising:

one or more processors and one or more nontransitory computer-readable mediums storing instructions that are executable by the one or more processors, wherein the instructions comprise:

generating a two-dimensional (2D) lidar array having a plurality of cells, wherein each cell is associated with a coordinate indicative of a position of the cell in the 2D lidar array;

interpolating image data from a virtual camera with the 2D lidar array to define auxiliary image data, wherein the auxiliary image data correlates the plurality of cells of the 2D lidar array with a plurality of pixels of the image data;

generating a virtual ambient image based on a red-channel (R-channel) data of the auxiliary image data;

identifying a plurality of virtual echoes of the virtual SPAD lidar sensor based on the R-channel data and a defined photon threshold;

defining a virtual point cloud indicative of virtual photon measurements of the virtual SPAD lidar sensor based on the plurality of virtual echoes;

simulating operation of a digital having the virtual SPAD lidar sensor based on virtual sensor data of the virtual SPAD lidar sensor, wherein the virtual sensor data includes data indicative of the virtual ambient image, the virtual photon measurements, the virtual point cloud, or a combination thereof, determining a virtual photon measurement for each cell of the plurality of cells based on the R-channel data of the auxiliary image data;

determining a virtual fill factor of the virtual SPAD lidar sensor based on the virtual photon measurements and a Gaussian kernel-based model, wherein the plurality of virtual echoes is identified based on the virtual fill factor of the virtual SPAD lidar sensor and the defined photon threshold;

determining a number of signal photons for a selected time interval based on a signal photon model and the R-channel data;

determining a number of ambient photons based on a normalization of the R-channel over the auxiliary image data; and generate a three-dimensional (3D) tensor photon count for the selected time interval based on the number of signal photons and the number of ambient photons.

10. The simulation system of claim 9, wherein, for each cell of the 2D lidar array, the virtual fill factor of the virtual SPAD lidar sensor is determined based on the 3D tensor photon count and the Gaussian kernel-based model.

11. The simulation system of claim 9, wherein the image data from the virtual camera includes data indicative of red-green-blue (RGB) image, a depth image, and a surface normal image.

12. The simulation system of claim 9 wherein the virtual photon measurement is indicative of a signal photon and an ambient photon.

13. A simulation system of a virtual single-photon avalanche diode (SPAD) lidar sensor, the simulation system comprising:

one or more processors and one or more nontransitory computer-readable mediums storing instructions that are executable by the one or more processors, wherein the instructions comprise:

generating a two-dimensional (2D) lidar array having a plurality of cells, wherein each cell is associated with a coordinate indicative of a position of the cell in the 2D lidar array;

interpolating image data from a virtual camera with the 2D lidar array to define auxiliary image data, wherein the auxiliary image data correlates the plurality of cells of the 2D lidar array with a plurality of pixels of the image data;

generating a virtual ambient image based on a red-channel (R-channel) data of the auxiliary image data;

identifying a plurality of virtual echoes of the virtual SPAD lidar sensor based on the R-channel data and a defined photon threshold;

defining a virtual point cloud indicative of virtual photon measurements of the virtual SPAD lidar sensor based on the plurality of virtual echoes;

simulating operation of a digital having the virtual SPAD lidar sensor based on virtual sensor data of the virtual SPAD lidar sensor, wherein the virtual sensor data includes data indicative of the virtual ambient image, the virtual photon measurements, the virtual point cloud, or a combination thereof;

determining a virtual photon measurement for each cell of the plurality of cells based on the R-channel data of the auxiliary image data, wherein the virtual photon measurement is indicative of a signal photon and an ambient photon;

the image data from the virtual camera includes data indicative of red-green-blue (RGB) image, a depth image, and a surface normal image, and the instructions for determining the virtual photon measurement further comprises:

determining a number of signal photons for a selected time interval based on a signal photon model, the R-channel data of the RGB image, and data indicative of the depth image;

determining a number of ambient photons based on a normalization of the R-channel data over the auxiliary image data; and generating a three-dimensional (3D) tensor photon count for the selected time interval based on the number of signal photons and the number of ambient photons.

14. The simulation system of claim 13, wherein the instructions of identifying the plurality of virtual echoes of the virtual SPAD lidar sensor further comprises:

sorting values of a photon count for the selected time interval in descending order;

selecting top-K photon counts from among the photon counts arranged in descending order, where K is a number greater than one;

determining whether a selected photon count from among the top-K photon counts is less than the defined photon threshold;

removing the selected photon count from among the top-K photon counts in response to the selected photon count being less than the defined photon threshold; and identifying the selected photon count as a virtual echo for the plurality of virtual echoes in response to the selected photon count being greater than the defined photon threshold.

15. A method of generating virtual sensor data of a virtual single-photon avalanche diode (SPAD) lidar sensor, the method comprising:

generating a two-dimensional (2D) lidar array having a plurality of cells, wherein each cell is associated with a coordinate indicative of a position of the cell in the 2D lidar array;

interpolating image data from a virtual camera with the 2D lidar array to define auxiliary image data, wherein the image data from the virtual camera includes data indicative of red-green-blue (RGB) image, a depth image, and a surface normal image, wherein the auxiliary image data correlates the plurality of cells of the 2D lidar array with a plurality of pixels of the image data;

generating a virtual ambient image based on a red-channel (R-channel) data of the auxiliary image data;

determining a virtual photon measurement for each cell of the plurality of cells based on the R-channel data of the auxiliary image data;

determining a virtual fill factor of the virtual SPAD lidar sensor based on the virtual photon measurements and a Gaussian kernel-based model, wherein the plurality of virtual echoes is identified based on the virtual fill factor of the virtual SPAD lidar sensor and the defined photon threshold;

identifying a plurality of virtual echoes of the virtual SPAD lidar sensor based on the virtual fill factor and a defined photon threshold;

defining a virtual point cloud indicative of virtual photon measurements of the virtual SPAD lidar sensor based on the plurality of virtual echoes;

determining a virtual photon measurement for each cell of the plurality of cells based on the R-channel data of the auxiliary image data;

determining a number of signal photons for a selected time interval based on a signal photon model and the R-channel data;

determining a number of ambient photons based on a normalization of the R-channel over the auxiliary image data; and generate a three-dimensional (3D) tensor photon count for the selected time interval based on the number of signal photons and the number of ambient photons; and outputting data indicative of the virtual ambient image, the virtual photon measurements, the virtual point cloud, or a combination thereof, as a virtual sensor data of the virtual SPAD lidar sensor.

\* \* \* \* \*